No. 648,663. Patented May 1, 1900.
P. HÖRR.
PULVERIZING HARROW.
(Application filed June 15, 1898.)
(No Model.)
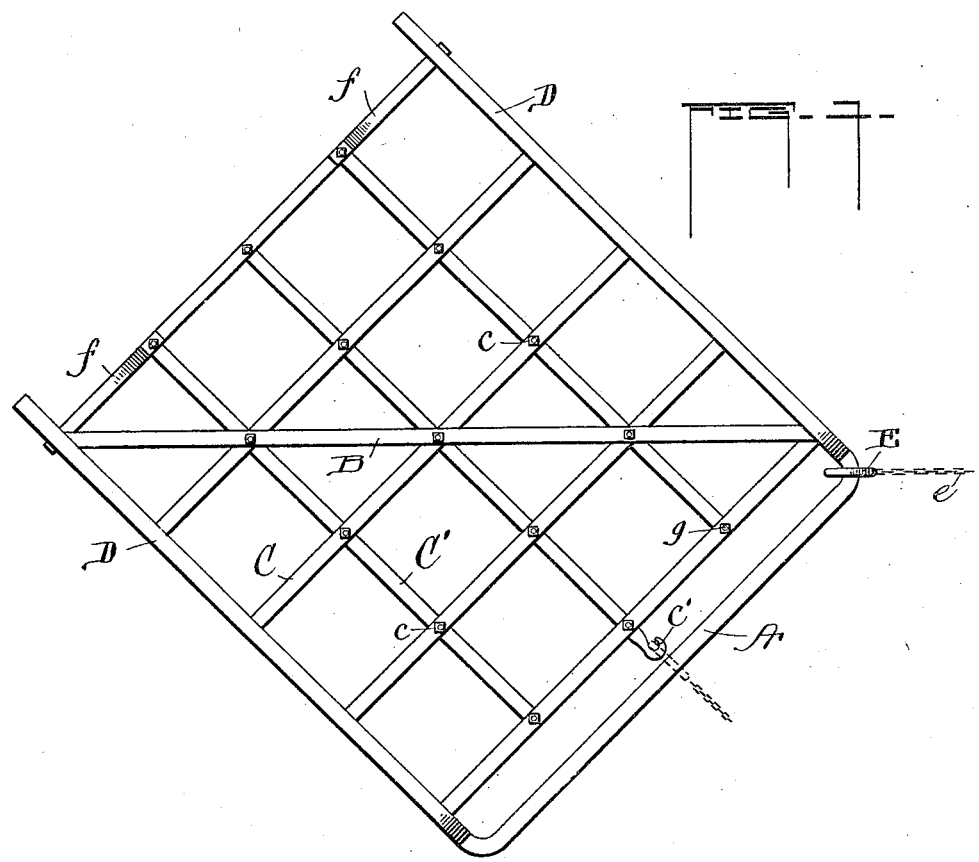
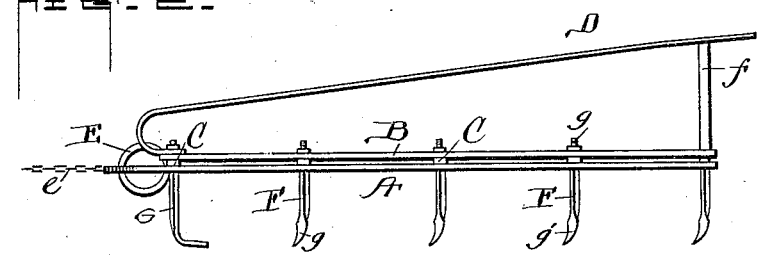
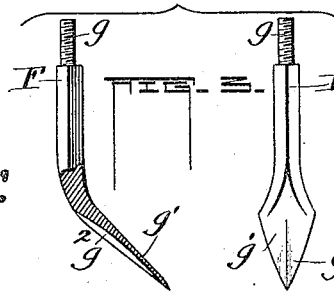
Witnesses:
Chas N La Port
A. Dixon
Inventor
Philipp Hörr
by W. V. Teff
Atty

UNITED STATES PATENT OFFICE.

PHILIPP HÖRR, OF PEORIA, ILLINOIS.

PULVERIZING-HARROW.

SPECIFICATION forming part of Letters Patent No. 648,663, dated May 1, 1900.

Application filed June 15, 1898. Serial No. 683,488. (No model.)

*To all whom it may concern:*

Be it known that I, PHILIPP HÖRR, a citizen of the United States, residing at Peoria, in the county of Peoria and State of Illinois, have invented certain new and useful Improvements in Pulverizing-Harrows; and I do hereby declare that the following is a full, clear, and exact description of the invention, which will enable others skilled in the art to which it appertains to make and use the same.

My invention relates to certain new and useful improvements in pulverizing-harrows by means of which a harrow is provided having particular and special features of construction which render it particularly well fitted as a pulverizer and other detail features that facilitate particularly the removal or transportation of the harrow to and from different places.

More particularly my invention relates to a toothed harrow adapted to drag over the surface of the ground; and the principal feature in the invention therein consists in the particular manner in which the teeth are constructed, the toothed stem consisting of a rectangular body secured to the main frame, to which all of the separate teeth are attached, the lower end of the tooth being expanded and tapered into shovel form and grooved in a particular manner at the rear of the blade or shovel, as will hereinafter be more particularly shown and described. Also my invention includes certain raised frame parts supported on the top of the main harrow-framework, which serve as runners to support the harrow when it is inverted or turned upside down, which, as before stated, facilitates the removal of the harrow from one place to another, the harrow being dragged along upon the runners. The upright frame parts which serve as runners also provide handholds for the operator when the harrow is in use, which enables him to raise it or turn it from side to side conveniently.

That my invention may be more fully understood, reference is had to the accompanying drawings, in which—

Figure 1 is a plan view showing the top of the harrow-frame and shows it in position as it is worked in the field, also showing in dotted lines the manner of hitching to the harrow when it is being dragged on the runners. Fig. 2 is side elevation of the harrow, showing all the main features in the construction of the harrow. Fig. 3 shows the harrow tooth or blade, the figure at the left showing a side view of the same with a portion of the lower part cut away for the purpose of showing the grooved part, the figure at the right showing a rear view of the tooth or blade.

Referring to the drawings the same reference-letters are used to designate the same parts in the different figures.

A is the main frame of the harrow.

C are cross frame parts connecting with the frame part A at the sides, and the frame-pieces C' being connected with the cross-pieces C.

B is a diagonal brace crossing the harrow, as shown in Fig. 1.

F F are the harrow-teeth, the same having threaded stems $g$ at their top ends, as shown in Fig. 3. These threaded stems $g$ are inserted through certain perforations provided in the cross-pieces C C' and the frame part A, and suitable nuts $c$ are applied which secure the frame parts firmly together and hold the teeth rigidly in the frame. The teeth F are all set so that the blades thereof face in the same direction, and that direction is diagonal with the main bearing of the frame parts and in the same direction as the brace B bears with relation to the balance of the framework.

Referring to Fig. 3, $g'$ is the blade portion of the tooth and is formed by flattening and curving the end of said tooth, thus forming the small blade or shovel. Opposite the face of the blade and at the rear thereof is the groove $g^2$, (shown in both views of Fig. 3,) provided for the purpose of equalizing the resistance to the passage of the blade through the ground, to adapt it for clearance which insures perfect scouring and no clogging. This particular groove, which enters into the construction of the tooth, is one of the main features thereof and is essential to the perfect working of the same.

The above are the main features in the construction of the harrow proper.

G is a footpiece constructed similar to the tooth and attached to the framework in the same manner, but is bent at right angles at its lower end and flattened, adapting it to hold the harrow out of the ground to some extent at its forward end. This footpiece is placed at the corner of the harrow from which it is dragged over the ground. This footpiece prevents the teeth from penetrating too deeply in the ground and offsets the tendency to constant downward draft of the harrow.

In the drawings, D D are sled-runners, the same being curved at their forward ends and attached to the framework and at their rear portion are supported upon the frame-pieces $ff$, the sled-runners extending beyond the frame-pieces $ff$ to provide handholds.

I desire to call attention to the forward end of the harrow as it is shown in Fig. 1 and to note the fact that the position of the harrow there shown is the position of the harrow when it is being dragged in the field. The chain $c$, connected to the small ring E, indicates the point where the draft is applied. The ring E is not fixed at this point, but may slide from one side of the harrow to the other, which is a convenient connection, as the ring being so connected that it may shift readily facilitates turning the harrow and also adapts the ring to be shifted from its normal draft position when it is working to the hooks $c'$, which is the connection made when the harrow is inverted for the purpose of dragging it upon the runners D, this adjustment being made without detaching the ring E, it being always attached to the harrow, with no chance for its being lost.

The harrow, as shown and described in the drawings, when applied for practical use in the field serves a purpose beyond that ordinarily required of the ordinary harrow, which is merely to pulverize and level the immediate surface of the ground, but serves the further purpose of a disk pulverizer so far as penetration and loosening of the ground is concerned, and also serves every purpose of a cultivator when used for like purposes; but it does not ridge the ground as the disk pulverizer and the cultivator, which requires the application of a harrow to level it before seeding, but leaves the ground as level as the ordinary harrow and loosens it as effectually and as deeply as the disk pulverizer or the cultivator.

Having thus fully described my invention, what I claim, and desire to secure by Letters Patent, is—

1. In a pulverizing-harrow, the combination with the framework thereof of a series of harrow-teeth supported therein, each formed of a vertical stem and the lower end thereof expanded and forwardly curved to form a small shovel and provided with a groove at the back of the shovel, and a footpiece set in the forward part of the framework adapted to drag on the surface of the ground, substantially as described and shown.

2. In a pulverizing-harrow, the combination, with the framework consisting of the main outside frame A, the cross-frame parts C, C', and the diagonal frame-piece B, of the harrow-teeth F, supported therein and expanded and forwardly curved at their lower ends to form the small shovels $g'$, provided with a groove at the back of the shovel, and the footpiece G, substantially as described and shown.

3. In a pulverizing-harrow, the combination, with the framework consisting of the main frame part A, the cross-pieces C, C', and the diagonal frame-piece B, of the harrow-teeth F, securely attached to the framework and expanded and curved at their lower ends to form the small shovels $g'$, having the groove $g^2$ at the rear of the shovels; the footpiece G, secured to the framework and the runners D, D, secured to the upper part of the harrow-framework, substantially as described and shown.

In testimony whereof I affix my signature in presence of two witnesses.

PHILIPP HÖRR.

Witnesses:
 PEARL BABCOCK,
 W. V. TEFFT.